July 30, 1968  H. W. COHEN ET AL  3,394,812
HYDRAULIC SYSTEM CONDITIONING APPARATUS
Filed July 10, 1963  4 Sheets-Sheet 1

Inventors:
Harold W. Cohen
Wesley A. Peterson
By
Atty.

July 30, 1968　　　H. W. COHEN ET AL　　　3,394,812
HYDRAULIC SYSTEM CONDITIONING APPARATUS
Filed July 10, 1963　　　　　　　　　　　　　　4 Sheets-Sheet 2

Inventors:
Harold W. Cohen
Wesley A. Peterson
By Louis Bernat
Atty.

July 30, 1968  H. W. COHEN ET AL  3,394,812
HYDRAULIC SYSTEM CONDITIONING APPARATUS
Filed July 10, 1963  4 Sheets-Sheet 3

FIG. 5.

Inventors:
Harold W. Cohen
Wesley A. Peterson
By Louis Bernat
Atty.

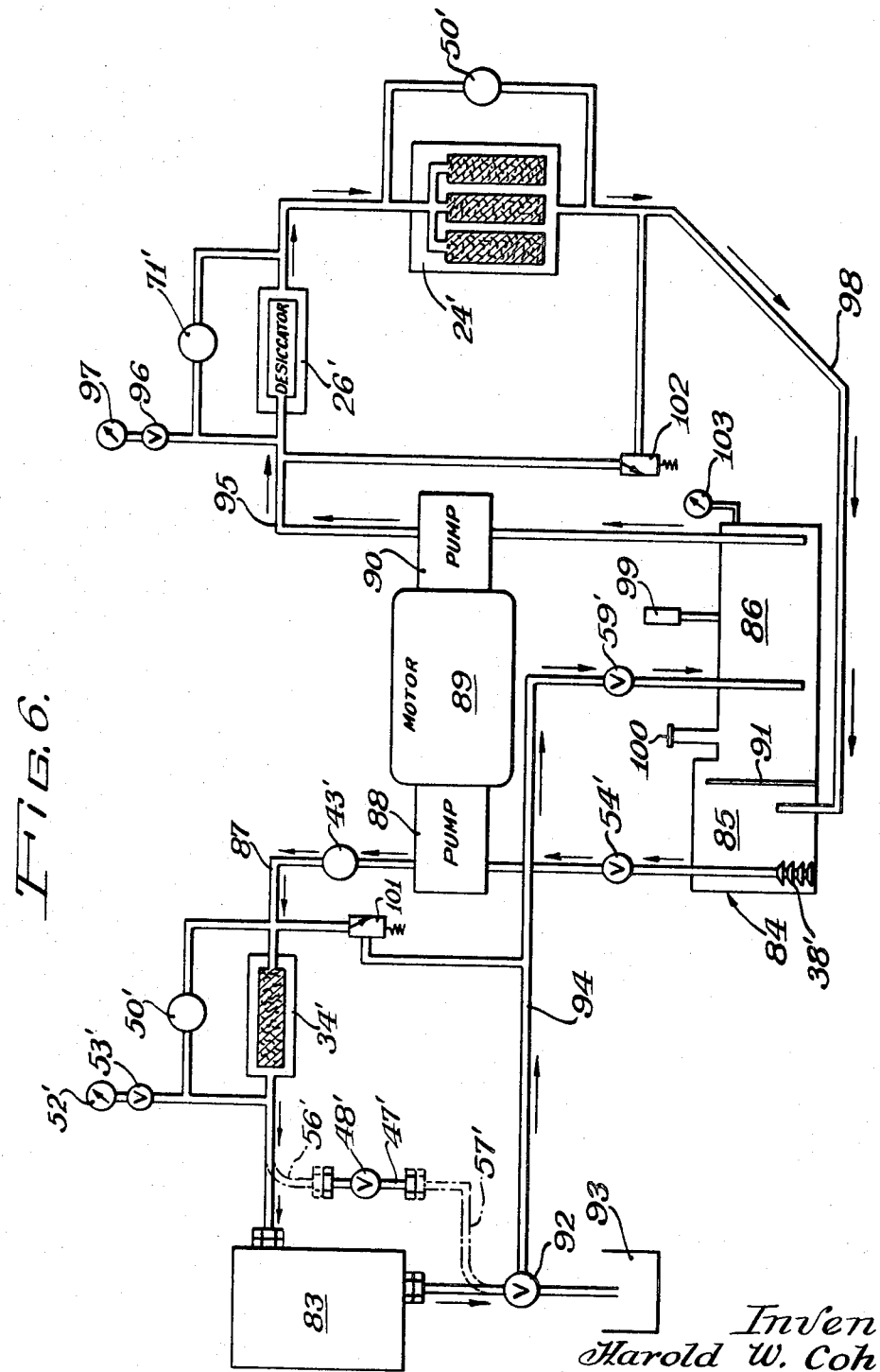

United States Patent Office 3,394,812
Patented July 30, 1968

3,394,812
HYDRAULIC SYSTEM CONDITIONING
APPARATUS
Harold W. Cohen, Los Angeles, and Wesley A. Peterson, Alameda, Calif., assignors to Dynalectron Corporation, Washington, D.C., a corporation of the District of Columbia
Filed July 10, 1963, Ser. No. 294,020
6 Claims. (Cl. 210—134)

This invention relates to a conditioning system for servicing hydraulic systems and, more particularly, to novel means for conditioning hydraulic systems in aircraft, missiles and the like aerospace vehicles.

Hydraulic systems perform a critical role in the operation of aircraft, missiles and the like aerospace vehicles. Such systems must be free from contamination in order to prevent failure and operational losses. Due to the desire to achieve higher performance to weight ratio, clearances have decreased in the operating components in the hydraulic systems in aerospace vehicles and operating pressures have increased in such systems. Close tolerance valve spool operation in the environment of high pressure within such systems has forced manufacturers to assemble and test hydraulic equipment under maximum conditions of cleanliness in so-called "clean rooms." Ordinarily, after test, the equipment is removed from the protected environment and introduced into an unprotected environment for normal operation and maintenance.

At the present time, hydraulic servicing units for aerospace vehicles perform little or no filtering action upon the hydraulic fluid introduced into the hydraulic system of the aerospace vehicle being serviced. Most in-service units incorporate inadequate filtering systems. In addition, supposedly clean oil, as received from refineries, has been found to contain contamination with particle sizes as large as 100 microns. Such degree of contamination is far too great for satisfactory performance in modern aerospace vehicle hydraulic systems. It has been found that hydraulic systems must be clean and free-running to function properly and that the level of cleanliness must be increased in order to keep up with the higher criteria of today's hydraulic equipment.

Among the principal causes contributing to failure in hydraulic systems are (1) contaminants present in the hydraulic system due to normal assembly operation, (2) contaminants present in the hydraulic fluid as received from refineries, (3) contaminants present in hydraulic testing facilities, and (4) contaminants such as micronic particles generated by cylinders, pumps, valves and the like during operation and use of the equipment.

Further, it has been found that merely draining and refilling the system with a so-called clean hydraulic fluid is not adequate to provide a system free from contamination.

Accordingly, an object of this invention is to provide a novel conditioning means for cleaning hydraulic systems in aerospace vehicles.

An important object of the present invention is to provide novel conditioning apparatus for effectively cleaning hydraulic systems and the hydraulic fluid used therein.

Another object of this invention is to provide novel means for conditioning hydraulic systems in aerospace vehicles, such means comprising a unique arrangement for filtering and removing substantially all contaminants from the hydraulic system and from the hydraulic fluid.

Yet another object of this invention is to provide novel conditioning apparatus for performing on-site conditioning of a hydraulic system in an aerospace vehicle.

A further object of the present invention is to provide novel conditioning apparatus for separately cleaning the hydraulic system, for separately cleaning the fluid as received from the refinery, and for refilling the clean system with clean fluid.

Other objects will be readily perceived from the following description.

The present invention relates to a dynamic conditioning system for use with a fluid system in a high altitude space vehicle, such dynamic conditioning system comprising reservoir means, conduit means for communicating said fluid system in said space vehicle with said reservoir means, filter means in the conduit means for filtering the fluid supply to said fluid system in said space vehicle, valve means in said conduit means for selectively draining contaminated fluid from said fluid system in said space vehicle from conduit means, pump means for circulating fluid through said conduit means, and filter means for filtering the contaminated fluid returned from said fluid system in said space vehicle.

The attached drawings illustrate preferred embodiments of the invention, in which:

FIGURE 5 is a schematic fluid flow diagram for one embodiment of the dynamic conditioning system of the present invention; and FIGURE 6 is a schematic fluid flow diagram for a modified dynamic conditioning system.

Figure 1:
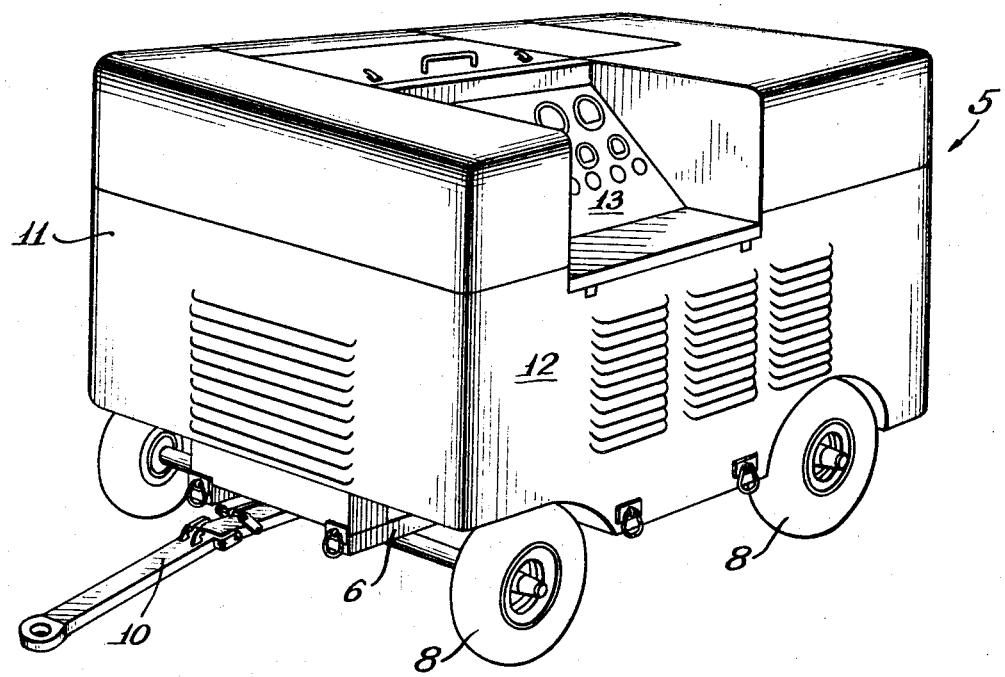
FIGURE 1 is a perspective view of a conditioning apparatus embodying the present invention.

Referring now to FIGURE 1, there is illustrated a perspective view of the conditioning apparatus of the present invention. The conditioning apparatus 5 is preferably carried on a frame 6 supported on a plurality of wheels 8 for movement over the ground. Secured at one end of the frame 6 is a handle 10 for affixing the conditioning apparatus 5 to a suitable towing vehicle, as for example, a tractor.

The conditioning apparatus 5 also includes a housing 11 having removable side panels 12 affixed thereto. Provided on the housing 11 is a control panel 13 which includes the various indicating gauges, panel gauges and controls for the conditioning apparatus. The control panel is designed to conform to the human engineering requirements of the military.

Figure 2:
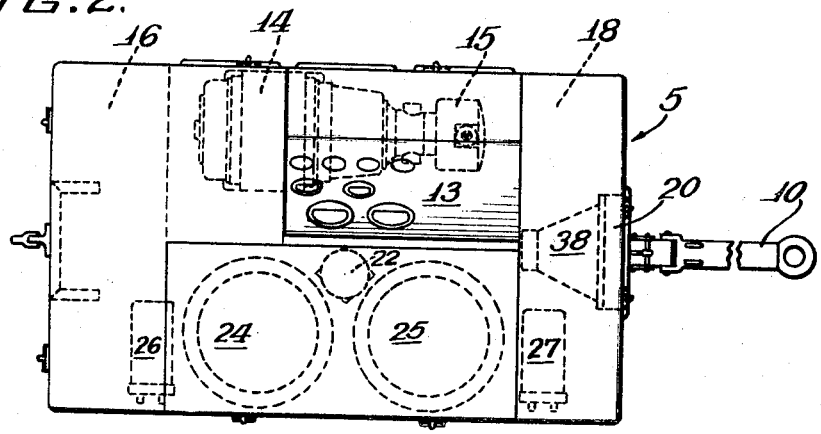
FIGURE 2 is a top view of the conditioning apparatus with the main components thereof being indicated in dotted line.
Figure 3:
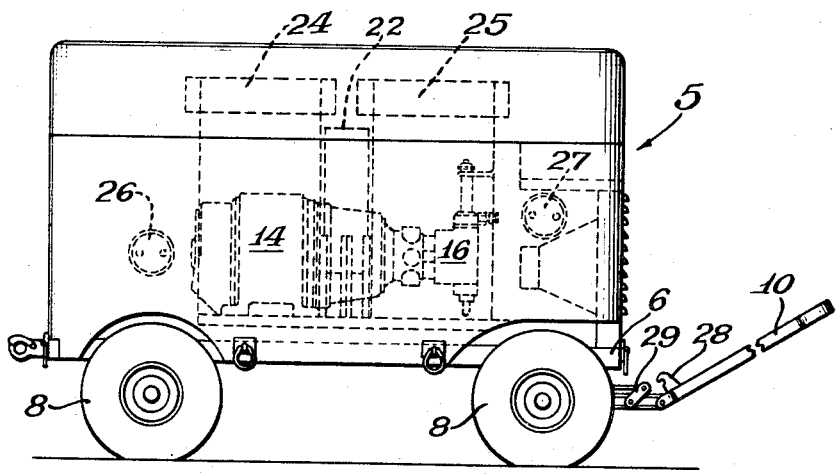
FIGURE 3 is a left side view of the conditioning apparatus.
Figure 4:
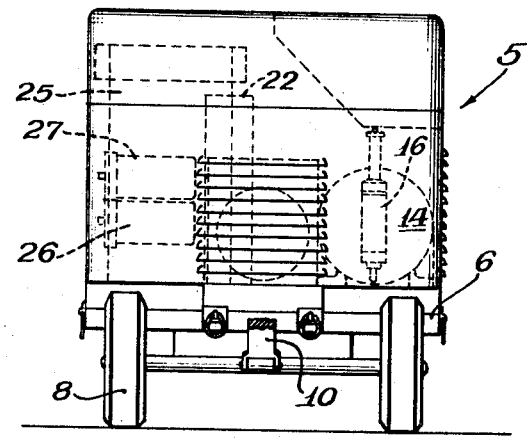
FIGURE 4 is a front view of the conditioning apparatus.

Turning now to FIGURES 2, 3 and 4, there are illustrated further views of the conditioning apparatus 5 more particularly illustrating the location of some of the major components of the conditioning apparatus.

Supported on the frame 6 are the components of a conditioning system. Such system includes a motor and pump assembly comprising a motor 14 to which is directly coupled a high-speed variable-volume, and pressure-compensated pump 15. Motor 14 may be a 60 horsepower, 3600 r.p.m. electric motor having a flanged single end bell. In a presently preferred embodiment, pump 15 will deliver 35 gallons per minute at 3000 pounds per square inch.

Also supported on the frame 6 are reservoir means comprising a tank 16 for conditioning fluid and a tank 18 for hydraulic supply fluid. The conditioning fluid is preferably a hydrocarbon solvent, as for example, Stoddard solvent. Each tank or reservoir 16 and 18 is equipped with magnetic particle removers, anti-vortex baffles and is vented to the atmosphere through a desiccator-filter to prevent the introduction of water vapor and contaminants. The filler caps for each of the reservoirs seal tightly to prevent air-borne contamination from entering the respective reservoirs.

A filter 22 is provided for removing large particles from the fluid passing through the conditioning system to the areospace vehicle. A pair of filter complexes 24 and 25 are carried on frame 6, one functioning in cooperation with the conditioning fluid reservoir 16 to clean conditioning fluid and the second functioning in cooperation with the hydraulic fluid reservoir 18 to clean hydraulic fluid.

Associated with each of the filter complexes 24 and 25 is a desiccator 26, 27 for moving water from the fluid media in the conditioning system.

As indicated in FIGURE 3, the handle 10 may be provided with a hook-like projection 28 to engage the pivoted member 29 on the frame and cause engagement of the brakes on frame 6 when the handle is in the upright position.

Considering now FIGURE 5, there is illustrated a schematic fluid flow diagram of a dynamic conditioning system of the present invention.

It is seen that the reservoir means communicate with the aerospace vehicle 30 by means of an effluent circuit and an influent circuit. Among the main components in the effluent circuit from the reservoir to the aerospace vehicle 30 are a valve means 33, preferably comprising a three-way solenoid operated valve, the pump and motor assembly comprising the motor 14 and the pump 15 coupled thereto, high-pressure filter means 34 and a turbine flow meter 36.

Within each reservoir 16 and 18, there is provided a magnetic particle remover and anti-vortex baffle members 38 and 39, respectively. Fuid from each reservoir will pass through the respective particle remover and baffle means 38 and 39, and conduits 40 and 41, respectively, to the valve means 33. Conduit 42 communicates the valve means 33 with the pump 15.

It will be seen that an auxiliary circuit including the heat exchanger 20 is provided about the pump 15. The heat exchanger is preferably air cooled by fan 38. This circuit, which includes a high temperature safety switch 43, is for the purpose of maintaining a stable fluid temperature. A check valve 44 prevents the flow of fluid into the auxiliary circuit prior to passage through the pump 15. Pressure relief valves 37 are provided for bypassing fluid back to the supply conduit in the event of overload in the auxiliary heat exchange circuit.

High pressure output from the pump 15 passes through conduit 45 to the selector valve 46. Selector valve 46 either diverts the fluid through filter 34 to the aerospace vehicle 30 in use of the conditioning apparatus to condition a system in the aerospace vehicle or to the internal circulation and hose storage manifold 47 for bypassing the aerospace vehicle 30 when the conditioning equipment itself is being cleaned. Included in the internal circulation and hose storage manifold 47 and forming a part thereof is a flow control valve 48.

Tapped into the conduit 45 is a pump pressure gauge 51. Disposed upstream of the pump pressure gauge 51 is a valve 49 for regulating the fluid flow thereto.

Associated with the high pressure filter 34, which preferably effectively removes particles greater than two microns, is a pressure differential switch 50 for indicating when the filter is loaded with contaminants to the point of marginal usability. In the event that the filter is so loaded with contaminants, the pressure differential switch 50 will be actuated and a light will be illuminated on the control panel 13. At the same time, a cut-off relay (not shown) will be energized interrupting the operation of the conditioning system.

Also associated with the filter 34 is a system delivery pressure gauge 52 and a pressure gauge snubber valve 53 mounted upstream of the system delivery pressure gauge 52.

Fluid flowing through the effluent circuit will pass through the turbine flow meter 36 for the programmer control and through the inspection sampling valve 54 to the aerospace vehicle.

The couplings 56 and 57 to the aerospace vehicle 30 as indicated in solid line are the positions of the couplings when the conditioning system is in use for conditioning the hydraulic system of a high altitude aerospace vehicle. The dotted line positions of the couplings indicate the position of the couplings when the aerospace vehicle is bypassed and the couplings are stored or are in position for internally cleansing the conditioning system. The couplings 56 and 57 are preferably quick disconnect couplings with automatic shut-off.

Fluid discharged from the aerospace vehicle passes through the conduit 58 in the influent circuit through the inspection sampling valve 59 and the flow control valve 60.

Conduit 58 communicates with valve means 62 which comprises a four-way solenoid operated valve for selecting a predetermined path of system return flow from the aerospace vehicle to the reservoir means, or to an external drain tank. Valve means 33 and valve means 62 are operatively electrically interlocked. The conduit 63 communicating the valve means 62 with the external drain tank 64 may be provided with a shut-off valve 65.

The valve means 62 is adapted to be electrically connected with a control means 68 which in turn is operatively connected with the turbine flow meter 36 in the high pressure line to the aerospace vehicle. The flow meter 36 will generate electrical impulses in direct ratio to the amount of fluid flow passing through it. These electrical impulses are supplied to an integrating amplifier within control means 68. The integrating amplifier within control means 68 will translate these impulses into volume measurement. The measurement will be read from a gallonage indicator 69 incorporating a predetermined counter. The predetermined counter will provide automatic valve sequencing when changing from conditioning fluid to hydraulic fluid. An adjustable programming mechanism may be provided to control fluid circulation dwell-time for automatic operation after initiation of the conditioning cycle.

As above noted, the valve means 62 will divert the flow of fluid media returning from the aerospace vehicle 30 to the reservoir means through either a first conditioning fluid circuit or a second hydraulic fluid circuit. Conditioning fluid will pass from the valve means 62, through filter 22 for removal of large particles from the fluid media, through desiccator 26 for removal of water from the fluid media, and through the filter complex 24 back to the conditioning fluid reservoir 16. It will be noted that a pressure differential switch 50 is provided for filter 22 and filter 24, respectively, to indicate impending filter replacement. A similar pressure differential switch 71 is provided for desiccator 26.

Hydraulic fluid will be diverted from valve means 62 through desiccator 27 for removing the water therefrom and then through the filter complex 25 for return to the hydraulic fluid reservoir. The desiccator may be provided with a pressure differential switch 71 to indicate impending replacement of the filter component therein. A pressure differential switch 50 is provided for filter complex 25.

It is preferred that the filter 22 comprises a 15-micron level filter for large particle removal. The filters within the filter complexes 24 and 25 are adapted to purify and remove contaminants to a 2-micron level.

Each tank 16 and 18 may be provided with a sealing filler cap 76 to prevent air-borne contamination from entering the respective tank and with a filtered-desiccant vent 78 to prevent air-borne contamination and moisture from entering the respective tank.

As is shown in FIGURE 5, each of the auxiliary circuits in the influent stream is provided with a pressure relief valve 80 for bypassing the filters 24 and 25, respectively, in the event of clogging thereof or other undesirable pressure overload in the branches of the influent stream.

Turning now to FIGURE 6, there is illustrated a schematic flow diagram for a modified dynamic conditioning system. The system illustrated in FIGURE 6 is particularly adapted for use with a constant speed drive system as used, for example, for generating equipment on aircraft. It is noted that like components are indicated by primed numerals in FIGURE 6.

The constant speed drive system 83 under service is adapted to be detachably connected to a reservoir means 84 by means of the conduits 87 and 94, respectively. The reservoir means 84 preferably comprises a unitary tank including a supply reservoir 85 and a circulation reservoir 86 separated therefrom by a tank separator and spill plate 91 which defines a wall within the reservoir means.

Fluid is circulated through a first circuit defined by the conduits 87 and 94 by pump means 88. Pump means 88 comprise a vane pump driven by a motor 89 having a double-end bell mounting thereon for driving a pump at each end thereof. Motor 89 may be a five horsepower motor. In one presently preferred embodiment pump 88 will deliver ten gallons per minute at 300 pounds per square inch pressure. High pressure fluid is forwarded from pump 88 through the high pressure safety switch 43', a high pressure filter 34', and the constant speed drive system 83 under service to the selector valve 92.

The three-way selector valve 92 may be actuated to drain contaminated fluid from the conduit 94 into the drain tank or drain storage drum 93 or to permit the return of fluid from the constant speed drive system 83 to the circulation reservoir 86. Provided in the conduits 87 and 94 adjacent the reservoir means 84 are a pair of inspection sampling valves 54' and 59'.

Disposed in a branch conduit in parallel with the high pressure filter 34 is a pressure differential switch 50' for sensing impending filter replacement.

A pressure gauge 52' is provided to measure the system pressure and a suitable pressure gauge snubber valve 53' is provided to regulate the application of pressure to gauge 52'. The function of the circuit defined by the conduit means 87 and 94 and the components disposed therein is to deliver clean oil to the constant speed drive unit 83 being serviced.

Also provided in the dynamic conditioning system illustrated in FIGURE 6 is a second circuit for continuously circulating and cleaning the oil. The second circuit comprises a conduit 95 communicating the circulation reservoir 86 with the filter complex 24' and a conduit 98 for returning fluid from the filter complex 24' to the supply reservoir 85. Pump means comprising a vane pump 90, driven by motor 89, is provided in the conduit 95 to circulate fluid through the second circuit. Pump 90 in a presently preferred embodiment will deliver 15 gallons per minute at 100 pounds per square inch pressure. Also provided in conduit 95 is a desiccator 26' for removing water from the fluid.

Pressure differential switches 71' and 50' may be disposed adjacent the desiccator and the filter complex, respectively, to determine when the desiccator element or the filter unit should be replaced. Also provided in the second circuit is a pressure gauge 97 for measuring the pressure in the circuit and a snubber valve 96 for regulating the pressure supply to the pressure gauge 97.

The reservoir means 84 may be provided with a filtered-desiccant vent 99 to prevent air-borne contamination and moisture and a sealed filler cap 100 to prevent air-borne contamination.

Reservoir means 84 may be provided with a magnetic particle remover and anti-vortex baffle 38' and a suitable fluid level gauge means 103 for indicating the fluid level within the reservoir means.

A pressure relief valve 101, which may be set at a pressure of 300 pounds per square inch, is provided to bypass high pressure fluid in the first circuit in the event of a clogged filter 34' or other overloading of the circuit. A similar pressure relief valve 102 set at a pressure of 100 pounds per square inch is provided in the second circuit to provide for pressure relief between conduits 95 and 98 in the event of clogging of the desiccator 26' or the filter complex 24'.

Operation

For use, the conditioning apparatus 5 may be moved to a position adjacent the aerospace vehicle to be serviced. The necessary connections will be made by use of the quick connecting couplings 56 and 57. It will be apparent to those skilled in the art that the conditioning apparatus may be remotely located and extension connections utilized to connect the dynamic conditioning system to hydraulic system to be serviced. The control means on the conditioning apparatus is programmed for the desired sequence of operation and the servicing will automatically commence.

The motor 14 will be energized and pump 15 will commence operating. The valve means 33 will be actuated to permit the flow of conditioning fluid from the conditioning fluid reservoir 16 through conduits 40 and 42 to the inlet side of the pump 15. The conditioning fluid will be discharged by the pump 15 and flow through conduit 45, through the external-internal circulation selector valve 46, through the 2-micron high pressure filter 34, the turbine flow meter 36, sampling valve 54 and into the hydraulic system of the aerospace vehicle 30.

The conditioning fluid will force the used and contaminated fluid from the hydraulic system, through inspection sampling valve 59, flow control valve 60, and conduit 58 to the valve means 62. The contaminated liquid passes from the valve means 62 through the drain tank shut-off valve 65 and conduit 63 into the external drain tank 64 where the contaminated fluid is stored.

After the used and contaminated fluid has been removed from the system, valve 62, upon automatic signal from the control means 68, directs the flow of the conditioning fluid through the conditioning fluid filter circuit, which includes desiccator 26 and filter complex 24, back into the conditioning fluid reservoir 16.

The conditioning fluid will be circulated through the aerospace vehicle for a time to remove residual deposits and small micronic particles.

The hydraulic controls in the aerospace vehicle may be operated to provide complete circulation within the aerospace vehicle hydraulic system. Adequate pressure is provided within the dynamic conditioning system of the present invention to perform this operation.

After the programmed time, valve means 33 will close off the flow of fluid from the conditioning fluid reservoir 16 and start the flow of clean hydraulic fluid from hydraulic fluid reservoir 18 through conduit 41, valve means 33, and into conduit 42 for delivery to the inlet side of pump 15. The hydraulic fluid will follow the aforenoted hydraulic circuit and will push the conditioning fluid from the hydraulic system in the aerospace vehicle 30. The conditioning fluid being removed will continue to flow through valve 62 and into the conditioning fluid reservoir 16 through the filter complex 24.

Valve 62 will operate after the programmed gallonage has passed and divert the flow of clean hydraulic fluid through the hydraulic fluid filter circuit, which includes the desiccator 27 for water removal and the filter complex 25, and return the fluid to the hydraulic fluid reservoir 18.

Again the hydraulic controls in the aerospace vehicle 30 may be operated to provide complete circulation.

The hydraulic fluid continues to circulate for a programmed time, filtering any remaining particles, and thereby assuring complete circulation and cleaning of both the hydraulic fluid and the hydraulic system of the aerospace vehicle 30.

The operation of the motor and pump assembly may be terminated and the quick disconnect couplings 56 and 57 may be removed from the aerospace vehicle and affixed to the internal manifold 47. By subsequent actuation of selector valve 46 to permit flow of fluid through manifold 47 and energization of motor 14, the couplings may be cleansed of any contamination.

In addition to cleaning both the hydraulic fluid and the hydraulic system in which the fluid will be used, the dynamic conditioning apparatus may also be used for pressure and flow testing the hydraulic system in the aerospace vehicle. The pump 15 is a high-speed variable volume and pressure-compensated pump with 35 gallon per minute delivery at 3000 pounds per square inch. The pump will be able to generate pressures up to 5000 pounds per square inch. Such pressure is adequate for normal test purposes.

It is to be noted that there are two ways of cleaning either refinery supplied fluid or contaminated fluid when utilizing the dynamic conditioning system. One is to place fluid in the hydraulic fluid reservoir 18 and circulate it internally through the filter complex 25 utilizing the internal circulation manifold 47. The other manner would be to insert a drum pick-up conduit into the external drain tank for communicating the external drain tank to the supply side of the pump 15. Contaminated fluid would be drawn from the external drain tank 64 and passed through the pump 15 which will circulate the fluid through the filter complex and store it in either the hydraulic fluid reservoir 18 or in another drum.

Next, the typical operation of the modified dynamic conditioning system illustrated in FIGURE 6 will be briefly described. The conditioning apparatus of which the dynamic conditioning system is a part may be moved to the site of the aerospace vehicle to be serviced and the couplings 56' and 57' connected to the system to be serviced.

Contaminated oil is drained from the constant speed drive system 83 in the aerospace vehicle when valve 92 is suitably actuated and stored in drain storage drum 93.

The motor 89 is energized to drive the two pumps 88 and 90. The circulation pump 90, which is preferably a vane-type pump, will draw fluid from the circulation reservoir and pump it through the desiccator 26' and the two-micron filter complex 24', to cleanse the fluid and free it from contaminants.

After leaving the two-micron filter complex 24', the fluid flows through the conduit 98 into supply reservoir 85.

Pump 88 will pump clean oil through the high pressure filter 34' into the constant speed drive system 83 under service.

Clean oil is circulated through the constant speed drive system 83 back to the circulation reservoir 86 and the entire operation is then repeated for approximately twenty minutes. At the end of this time, the constant speed drive system 83 will be clean and free from contamination.

After charging the constant speed drive system 83 with clean fluid, as for example, MIL–L–7808 oil, the quick connecting couplings 56' and 57' may be disconnected. The constant speed drive system 83 is now completely and effectively serviced and ready for operational use.

By the novel dynamic conditioning systems of the present invention, the fluid utilized in a hydraulic system in an aerospace vehicle may be completely cleansed and the system may also be completely cleansed while on the site, without the need for extensive and expensive hydraulic system equipment removal. Damage-causing contaminants to a two-micron level are effectively removed from the hydraulic systems of aerospace vehicles. Among the contaminants removed are those present in the hydraulic system due to normal assembly operations, those contaminants present in the hydraulic fluid as received from the refineries, and those contaminants such as micronic particles generated by cylinders, pumps, valves, etc, during operation and use of the hydraulic systems. Further, by use of the conditioning system illustrated in FIGURE 5, which can be used for hydraulic testing, such contamination as was formerly introduced into an aerospace vehicle hydraulic system by the hydraulic testing facility itself, is eliminated.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. For use with a high altitude space vehicle, dynamic conditioning apparatus comprising a supply reservoir, a circulation reservoir, first conduit means communicating said supply reservoir and said space vehicle, second conduit means for communicating said space vehicle and said circulation reservoir, said first and second conduit means defining a first circuit, third conduit means for communicating said circulation reservoir with a filter complex for cleaning contaminated fluid, fourth conduit means for communicating said filter complex with said supply reservoir, said third and fourth conduit means defining a second circuit, valve means in said second conduit means for selectively draining fluid from said second conduit means when said valve means is in one poistion and returning said fluid to said circulation reservoir when said valve means is in another position, and pump means for circulating fluid through each of said circuits.

2. For use with a fluid system in a high altitude aerospace vehicle, a dynamic conditioning system comprising:
 (a) reservoir means containing a supply fluid reservoir and a conditioning fluid reservoir;
 (b) an effluent circuit for communicating said supply fluid reservoir and said conditioning fluid reservoir with said fluid system in said aerospace vehicle;
 (c) an influent circuit for communicating said fluid system in said aerospace vehicle with said supply fluid reservoir and said conditioning fluid reservoir;
 (d) filter means in said effluent circuit for filtering the fluid supplied to said fluid system in said aerospace vehicle;
 (e) valve means in said influent circuit for selectively draining contaminated fluid from said fluid system in said aerospace vehicle from said influent circuit;
 (f) pump means for circulating fluid through said circuits;
 (g) filter means for filtering the contaminated fluid returned from said fluid system in said aerospace vehicle; and
 (h) valve means in said effluent circuit interlocked with said valve means in said influent circuit for selectively directing flow from either said supply fluid reservoir or said conditioning fluid reservoir to said fluid system of said aerospace vehicle.

3. For use with a fluid system in a high altitude aerospace vehicle, a dynamic conditioning system comprising:
 (a) reservoir means containing a supply reservoir and a circulation reservoir;
 (b) an effluent circuit for communicating said supply reservoir with said fluid system in said aerospace vehicle;
 (c) an influent circuit for communicating said fluid system in said aerospace vehicle with said circulation reservoir;
 (d) filter means in said effluent circuit for filtering the fluid supplied to said fluid system in said aerospace vehicle;
 (e) valve means in said influent circuit for selectively draining contaminated fluid from said fluid system in said aerospace vehicle from said influent circuit;
 (f) pump means for circulating fluid through said circuits; and
 (g) filter means, provided in a flow path between the circulation reservoir and the supply reservoir, for filtering the contaminated fluid returned from said fluid system in said aerospace vehicle.

4. For use with a fluid system in a high altitude space vehicle, a dynamic conditioning system comprising:
   (a) reservoir means including a supply fluid reservoir and a conditioning fluid reservoir;
   (b) conduit means for forcing fluid through the system in said space vehicle and having an effluent path for forcing fluid into said space vehicle fluid system from said reservoir means and an influent path for returning fluid to said reservoir means;
   (c) filter means in said conduit means for filtering the fluid supplied to said fluid system in said space vehicle;
   (d) first valve means in said influent path conduit means for selectively draining contaminated fluid from said fluid system in said space vehicle from said conduit means or for communicating either of said reservoirs to said influent path;
   (e) pump means for circulating fluid through said conduit means;
   (f) filter means for filtering contaminated fluid from said fluid system in said space vehicle;
   (g) second valve means in said effluent path for selectively communicating either said supply fluid reservoir or said conditioning fluid reservoir to said effluent path, said first and second valve means being operatively interlocked; and
   (h) control means for actuating said first and second valve means to sequentially circulate conditioning fluid from said conditioning fluid reservoir and then supply fluid from said supply reservoir through said system in said space vehicle,
whereby fluid supplied to said fluid system will be cleaned and said fluid system will be cleaned.

5. A dynamic conditioning system as in claim 4, including connection means communicating with said conduit means for detachably connecting said conditioning system to said fluid system in said space vehicle and being adapted to be connected to a manifold for forming a closed loop when the dynamic conditioning system is not operatively connected to a fluid system in a high altitude space vehicle so as to remove contaminants from the connection means.

6. For use with high altitude space vehicles, dynamic conditioning apparatus comprising:
   (a) hydraulic fluid reservoir means;
   (b) conditioning fluid reservoir means;
   (c) first conduit means for communicating said hydraulic fluid reservoir means and said conditioning fluid reservoir means with a space vehicle;
   (d) second conduit means for communicating said space vehicle with said hydraulic fluid reservoir means and said conditioning fluid reservoir means;
   (e) first valve means for selectively communicating either said hydraulic fluid reservoir means when said first valve means is in a first position or said conditioning fluid reservoir means when said first valve means is in a second position with said first conduit means;
   (f) a filter in said first conduit means;
   (g) filter complexes in said second conduit means for removing impurities from said hydraulic fluid and said conditioning fluid; and
   (h) second valve means in said second conduit means operatively interconnected with said first valve means in said first conduit means for selectively draining the second conduit means when said second valve means is in one position and returning the fluid circulating therethrough either to said hydraulic fluid reservoir means or to said conditioning fluid reservoir means when said second valve means is in another position.

References Cited
UNITED STATES PATENTS

| | | | |
|---|---|---|---|
| 2,499,494 | 3/1950 | Greer | 210—87 X |
| 2,685,347 | 8/1954 | Busby | 210—168 X |
| 2,863,830 | 12/1958 | Schneider et al. | 210—287 X |
| 2,895,883 | 7/1959 | Hobson | 210—168 X |
| 2,959,008 | 11/1960 | Caroli | 210—223 X |
| 2,979,160 | 4/1961 | Haas | 210—168 X |
| 3,028,010 | 4/1962 | Headrick | 210—335 X |
| 2,698,112 | 12/1954 | Herderhorst | 222—72 |
| 3,169,667 | 2/1965 | Headrick | 222—189 X |

REUBEN FRIEDMAN, *Primary Examiner.*

J. L. DE CESARE, *Assistant Examiner.*